United States Patent [19]

Fukada et al.

[11] Patent Number: 4,671,615
[45] Date of Patent: Jun. 9, 1987

[54] CONTROL APPARATUS FOR A DAZZLE-FREE REFLECTION MIRROR OF A VEHICLE

[75] Inventors: Tsuyoshi Fukada, Nagoya; Yasutoshi Suzuki; Hiroshi Itoh, both of Oubu; Shinya Ohmi, Anjo; Kunihiko Hara, Nukata, all of Japan

[73] Assignee: Nippondenso Co., Ltd., Kariya, Japan

[21] Appl. No.: 688,505

[22] Filed: Jan. 3, 1985

[30] Foreign Application Priority Data

Jan. 12, 1984 [JP] Japan .................. 59-4635

[51] Int. Cl.⁴ .................. G02F 1/13; G02B 17/00
[52] U.S. Cl. .................. 350/331 R; 350/279; 283/338
[58] Field of Search .............. 350/342, 332, 338, 283, 350/279-281

[56] References Cited

U.S. PATENT DOCUMENTS

| | | |
|---|---|---|
| 2,444,976 | 7/1948 | Brown . |
| 3,269,267 | 11/1962 | Collins . |
| 3,542,455 | 11/1970 | Jensen . |
| 3,600,060 | 2/1970 | Churchill . |
| 3,601,614 | 8/1971 | Platzer .................. 350/279 |
| 3,705,310 | 12/1972 | Wild . |
| 3,787,110 | 1/1974 | Berreman et al. . |
| 3,862,798 | 1/1975 | Hopkins .................. 350/278 |
| 3,869,196 | 3/1975 | Kubota . |
| 3,921,162 | 11/1975 | Fukai et al. . |
| 3,932,026 | 1/1976 | Spokel . |
| 3,944,331 | 3/1976 | Janning . |
| 3,961,181 | 6/1976 | Golden . |
| 3,976,875 | 8/1976 | Engstrom et al. . |
| 3,986,022 | 10/1976 | Hyatt . |
| 4,029,393 | 6/1977 | Dungan et al. . |
| 4,040,727 | 8/1977 | Ketchpel . |
| 4,095,217 | 6/1978 | Tani et al. . |
| 4,161,653 | 7/1979 | Bedini et al. . |
| 4,200,361 | 4/1980 | Malvano . |
| 4,201,451 | 3/1980 | Jacob .................. 350/278 |
| 4,202,607 | 5/1980 | Washizuka et al. . |
| 4,229,077 | 10/1980 | Schwab . |
| 4,266,859 | 5/1981 | Togashi . |
| 4,279,474 | 7/1981 | Belgorod . |
| 4,342,030 | 7/1982 | Shanks . |
| 4,390,874 | 6/1983 | Woodside . |
| 4,408,837 | 10/1983 | Kozaki et al. . |
| 4,491,390 | 1/1985 | Tong-Shen . |
| 4,529,278 | 7/1985 | Nugget . |
| 4,530,571 | 7/1985 | Conner . |

FOREIGN PATENT DOCUMENTS

| | | |
|---|---|---|
| 0111907 | 6/1984 | European Pat. Off. . |
| 2416172 | 10/1975 | Fed. Rep. of Germany . |
| 2604462 | 8/1977 | Fed. Rep. of Germany . |
| 2732727 | 3/1978 | Fed. Rep. of Germany . |
| 2808260 | 8/1979 | Fed. Rep. of Germany ...... 350/278 |
| 2111683 | 6/1972 | France . |
| 48-35384 | 10/1973 | Japan . |
| 52-0040348 | 3/1977 | Japan . |
| 55-0039845 | 3/1980 | Japan .................. 350/605 |
| 57-0004003 | 1/1982 | Japan . |
| 57-0102603 | 6/1982 | Japan . |
| 490516 | 10/1937 | United Kingdom . |
| 2029343 | 3/1980 | United Kingdom ........ 350/279 |

*Primary Examiner*—John K. Corbin
*Assistant Examiner*—David Lewis
*Attorney, Agent, or Firm*—Cushman, Darby & Cushman

[57] ABSTRACT

A control apparatus for a dazzle-free reflection mirror of a vehicle is disclosed. The control apparatus is provided with a rear light sensor and a circuit for driving the reflection mirror into a dazzle-free condition in accordance with an intensity of a rear light detected by said rear light sensor when a light switch is turned on. The control apparatus is further provided with a winker manipulation detecting switch, a reverse position detecting switch and a steering wheel detecting switch for detecting a change in the moving direction of the vehicle. When one of them detects the change in the vehicle moving direction, the dazzle-free operation of the reflection mirror is disabled even if intensive light is incident to the reflection mirror from the rear of the vehicle.

12 Claims, 6 Drawing Figures

CONTROL APPARATUS FOR A DAZZLE-FREE REFLECTION MIRROR OF A VEHICLE

This application and the others included in the following list generally relate to the same subject matter area. However, each case is directed to a specific invention within that general subject matter and there is a line of demarcation among their respective claims. The generally related cases are as follows: Fukada Ser. No. 688,505 filed Jan 3, 1985; Itoh et al Ser. No. 670,015 filed Nov. 9, 1984; Itoh et al Ser. No. 616,185, filed June 1, 1984; Ito et al Ser. No. 593,946 filed Mar. 27, 1984; and Ohmi et al Ser. No. 671,612 filed Nov. 15, 1984.

BACKGROUND OF THE INVENTION

The present invention relates to a control apparatus for a reflection mirror of a vehicle which automatically effectuates a dazzle-free condition of the reflection mirror in accordance with a light incident from the rear of the vehicle.

In the past, as one of this sort of apparatuses, there has been known, for example, Japanese patent publication No. 48-35384 which discloses that a reflection mirror of a vehicle effectuates a dazzle-free condition of the reflection mirror when an intensive light incident from the rear of the vehicle is detected by a rear light detecting sensor.

It is disadvantageous however that, in spite of the time when the rear view image is required, for example, when the vehicle changes a driving lane, when the vehicle turnes to the left or right, and when the vehicle moves backward, the reflection mirror operates in the dazzle-free condition whenever an intensity of the light incident from the rear of the vehicle is higher than a predetermined value, because the reflection mirror is put into a dazzle-free condition without fail in response to detecting of the intensive rear light, whereby the rear view image can not be assured satisfactorily.

SUMMARY OF THE INVENTION

It is an object of the present invention to provide a control apparatus for a reflection mirror of a vehicle which prevents dazzling by light from the rear of the vehicle when the rear view image is required, even if the intensity of the light from the rear is higher than a predetermined intensity.

According to the present invention, in a control apparatus for a reflection mirror of a vehicle which effectuates a dazzle-free operation of the reflection mirror in accordance with an intensity of the light from the rear of the vehicle, the dazzle-free operation of said reflection mirror is disabled when manipulating a manipulation device mounted on the vehicle for changing the driving direction is detected by manipulation detecting means.

DETAILED DESCRIPTION OF THE PREFERRED EMBODIMENTS

Figure 1:
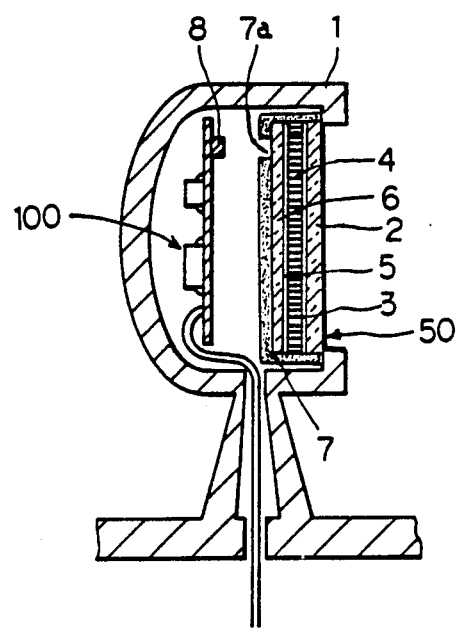
FIG. 1 is a sectional view of a side mirror such as a door mirror controlled by a control apparatus according to the present invention.

The present invention will be described hereinunder with reference to the embodiments shown in the drawings.

FIG. 1 shows a sectional view of one of two side mirrors of the vehicle. In FIG. 1, numeral 1 designates a frame of a side mirror in which a liquid crystal panel 50 is provided. The liquid crystal panel 50 consists of a transparent glass 2, a transparent electrode layer 3 made of idium tin oxide, a liquid crystal layer 4, a transparent electrode layer 5, a transparent glass 6 stacked in this order from the light incident side. Behind the liquid crystal panel 50, a reflection mirror layer 7 is provided. The liquid crystal panel 50 causes dynamic scattering by application of a voltage across the electrode layers 3 and 5 so that a transparency of the liquid crystal layer 4 is changed, whereby an intensity of light reflected by the side mirror is reduced.

On the other hand, a photo diode 8 as a rear light detecting sensor is provided behind the reflection mirror layer 7. The reflection mirror layer 7 has a small hole 7a in front of the photo diode 8 so that the light incident from the rear of the vehicle is received by the photo diode 8 therethrough. Furthermore, a driving circuit 100 which drives the liquid crystal panel 50 or controls the application of the voltage across the electrode layers 3 and 5 is provided in the frame 1.

Figure 2:
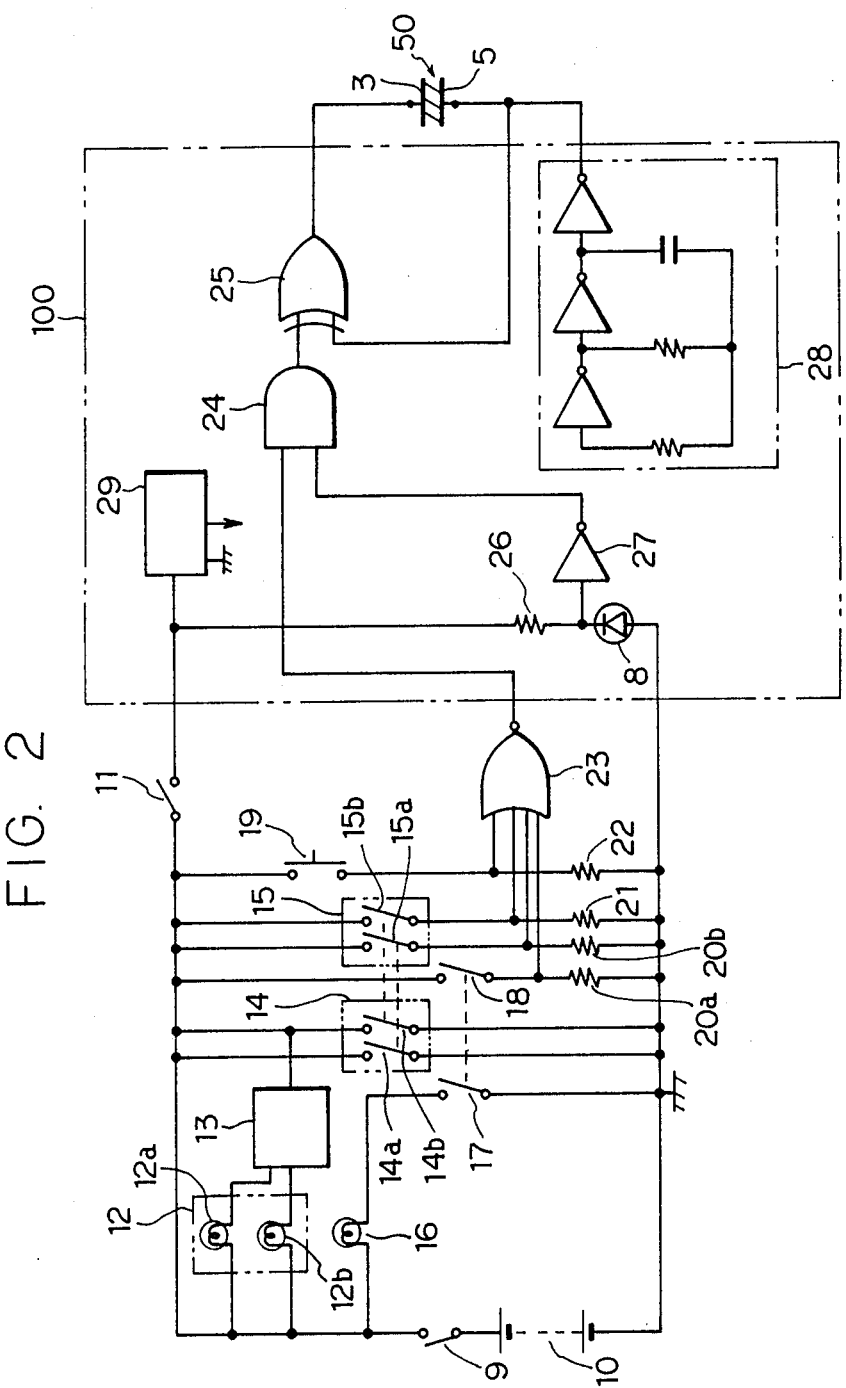
FIG. 2 is an electric wiring diagram of a control apparatus according to an embodiment of the present invention.
Figure 3A:
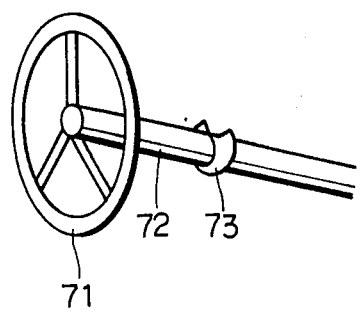
FIG. 3A is a schematic view of a steering wheel and a shaft of the vehicle.
Figure 3B:
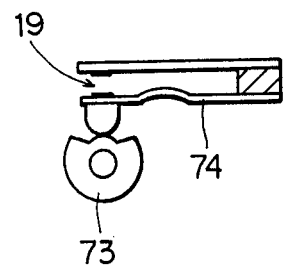
FIG. 3B is a schematic sectional view of a steering rotation detecting switch.

FIG. 2 shows an electric wiring diagram of a control apparatus for one of two side mirrors. In FIG. 2, numeral 9 designates an ignition switch, 10 a battery mounted on the vehicle, 11 a light switch for activating front light bulbs, 12 a winker lamp which comprises a pair of lamps 12a and 12b, 13 a lamp driving circuit, 14 a winker switch which comprises a pair of switches 14a and 14b, 15 a winker manipulation detecting switch which comprises a pair of switches 15a and 15b which cooperate with the switches 14a and 14b respectively. The switches 14a and 14b are respectively turned on when the vehicle turns to the left or right, whereby the lamp driving circuit 13 activates periodically one of the lamps 12a and 12b in response to the turned-on switch of the switches 14a and 14b. Numeral 16 designates a back-up lamp, 17 a back-up light switch which is turned on when a transmission shift lever is located on a reverse position, 18 a reverse position detecting switch which cooperates with the back-up light switch 17. Numeral 19 designates a steering wheel rotation detecting switch which is turned on when the steering wheel is rotated more than a predetermined angle. In more detail, as shown in FIG. 3A, a cam 73 is provided on a steering shaft 72 to rotate in proportion to the rotation of the steering wheel 71, and when the steering wheel 71 is rotated more than the predetermined angle, a board spring 74 in pushed up by the cam 73 as shown in FIG. 3B, so that the steering rotation switch 19 is turned on.

Numeral 20a, 20b 21 and 22 designate pull-down resistors respectively, 23 or NOR circuit, 24 an AND circuit, 25 an exclusive-OR circuit, 26 a resistor, 27 an NOT circuit, 28 an oscillation circuit for producing an oscillation signal at a fixed frequency to drive the liquid crystal panel 50. Numeral 29 designates a stabilized voltage supply circuit which supplies the NOR circuit 23, the AND circuit 24, the exclusive-OR circuit 25, the NOT circuit 27 and NOT circuits of the oscillation circuit 28 with a stabilized voltage when the stabilized voltage supply circuit 29 is supplied with the voltage from the battery 10 through the ignition switch 9 and the light switch 11.

Operation of the above-described embodiment will be described next.

With the ignition switch 9 being turned on and the light switch 11 being turned off because of the running in the daytime, the stabilized voltage supply circuit 29 is not supplied with any voltage to disable oscillation of the oscillation circuit 28 and hence the liquid crystal panel 50 to which no voltage is applied remains transparent. As a result, the side mirror shown in FIG. 1 does not become a dazzle-free condition so that the side mirror reflects the entire light incident from the rear of the vehicle.

Thereafter, assuming that the light switch 11 is turned on to activate the front light bulbs, the stabilized voltage supply circuit 29 is supplied with the voltage from the battery 10 and supplies each circuits with the stabilized voltage. At this time, assuming that all of the winker switch 14, the back-up light switch 17 are kept turned off and the steering wheel 71 is not rotated more than the predetermined angle, all the switches 15, 18, 19 are kept turned off respectively, whereby the output voltage of the NOR circuit 23 becomes high. In this state, provided that the light incident from the rear of the vehicle is not intensive enough, the detection voltage established by a voltage division by the resistor 26 and the photo diode 8 becomes high, so that the output voltage of the NOT circuit 27 becomes low. Therefore, the output voltage of the AND circuit 24 becomes low. On the other hand, the oscillation circuit 28 supplied with the stabilized voltage from the stabilized voltage supply circuit 29 applies the oscillation signal to the transparent electrode layer 5 of the liquid crystal panel 50 and to one of the input terminals of the exclusive-OR circuit 25. Hence it should be noted that, since the output voltage of the AND circuit 24 is low, the output voltage of the exclusive-OR circuit 25 is in the same phase relation with the oscillation signal from the oscillation circuit 28 and is applied to the transparent electrode layer 3 of the liquid crystal 50. As a result, the liquid crystal panel 50 to which no voltage is applied thereacross maintains transparency, and the side mirror is not put into a dazzle-free condition.

On the other hand, provided that the photo diode 8 detects that the light incident from the rear of the vehicle becomes intensive enough, the detection voltage established by the voltage division by the resistor 26 and the photo diode 8 becomes low, and the output voltage of the NOT circuit 27 becomes high, so that the output voltage of the AND circuit 24 becomes high. Therefore, the output voltage of the exclusive-OR circuit 25 is in the opposite phase relation with the oscillation signal from the oscillation circuit 28 and is applied to the transparent electrode layer 3 of the liquid crystal panel 50. As a result, the liquid crystal panel 50 to which the alternating current voltage is applied reduces the transparency, and the side mirror is put into the dazzle-free operation to prevent dazzling of the light incident from the rear of the vehicle.

Thereafter, provided that one of the switches 14a and 14b of the winker switch 14 is manipulated to turn on when the vehicle is about to turn to the left or right so that one of the switches 15a and 15b of the winker manipulation detecting switch 15 is turned on, that the steering wheel 71 is rotated more than the predetermined angle so that the steering manipulation detecting switch 19 is turned on, or that the back-up light switch 17 is turned on when the shift lever is located on the reverse position so that the backward detecting switch 18 is turned on, the output voltage of the NOR circuit 23 becomes low. Therefore, regardless of the output voltage of the NOT circuit 27, that is the output voltage in accordance with the intensity of the light incident from the rear of the vehicle, the output voltage of the AND circuit 24 becomes low, whereby the liquid crystal panel 50 to which no voltage is applied becomes transparent. Thus, when the vehicle turns to the left or right, when the vehicle changes a driving lane, or when the vehicle moves backward, dazzle-free operation of the side mirror is disabled so that the rear view image on the side mirror is assured.

It should be noted in the above-described embodiment that, though the reflection mirror 7 has the small hole 7a so that the light incident from the rear of the vehicle is received by the photo diode 8, the reflection mirror layer 7 may be changed to a translucent layer having no light passing hole as long as a part of the light incident from the rear of the vehicle is received by the photo diode 8 therethrough. In this instance, as the intensity of light incident to the photo diode 8 varies between the cases where the liquid crystal layer 4 is kept transparent and non-transparent, the discrimination level of the circuit which discriminates the intensity of light must be provided with a hysteresis.

Figure 4:
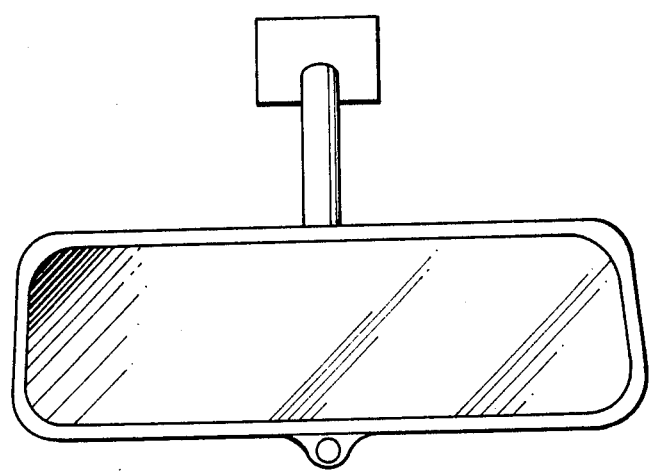
FIG. 4 is a front view of a room mirror controlled by a control apparatus according to this invention.

Further, the invention is described as having been applied to the side mirror used as a reflection mirror, it may be applied to an interior mirror such as a room mirror as well. In this instance, as shown in FIG. 4, a liquid crystal panel 50' is provided in front of a room mirror, and a photo diode 8' is provided at a front lower end of the room mirror.

Still further, though liquid crystal is used to perform the dazzle-free operation, other materials such as an electrochromic may be used as long as the transparency thereof changes with the application of a voltage. Further, the reflection mirror may be switched to its dazzle-free condition electromagnetically (mechanically) without using such materials.

Still further, as darkness detecting means for detecting darkness condition at the exterior of the vehicle, though the light switch 11 for switching on and off front light bulbs is used, a photo sensor for producing an output indicative of the intensity of the exterior light incident thereto and a comparator connected to the photo sensor for comparing the output of the photo sensor with a reference value indicative of a predetermined intensity of the exterior light may be used.

Still further, though all of the winker manipulation detecting switch 15, the steering rotation detecting switch 19, the reverse position detecting switch 18 are used in the above-described embodiment, it is possible to use only one of them.

Figure 5:
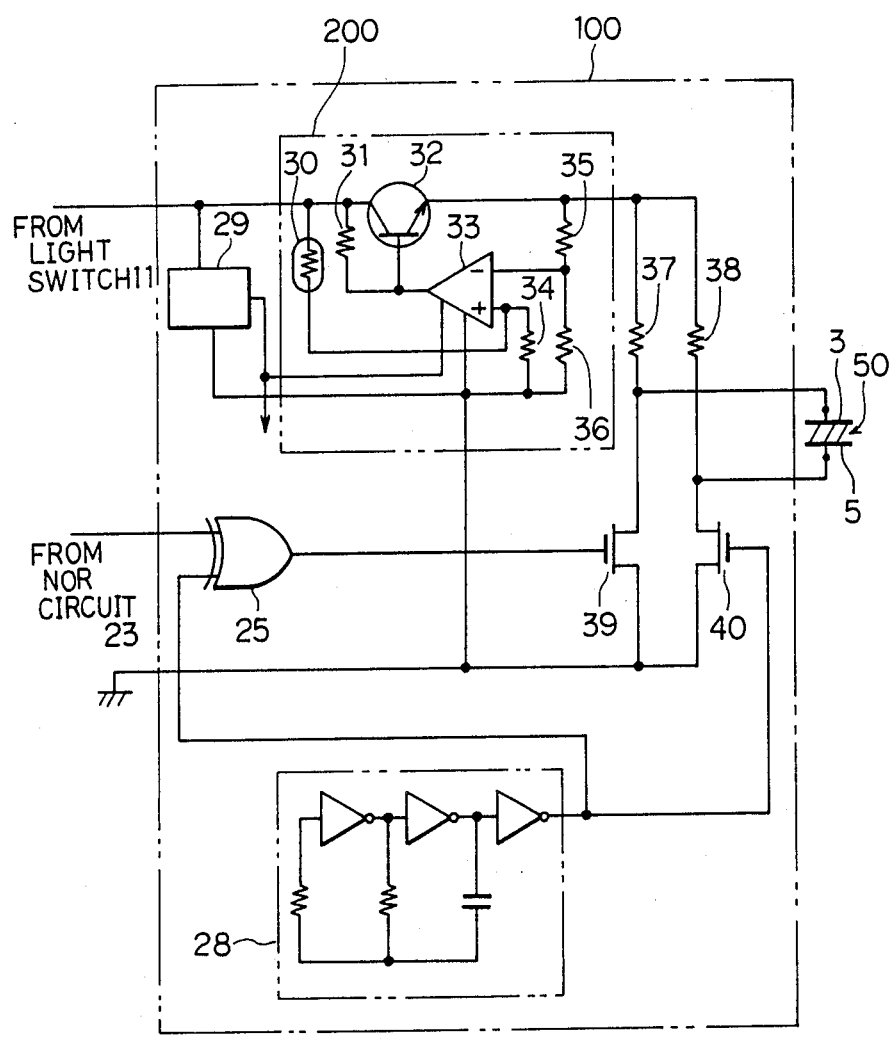
FIG. 5 is an electric wiring diagram of a control apparatus according to another embodiment of the present invention.

Still further, the invention can be applied to a dazzle-free reflection mirror which transparency is changed continuously in proportion to the intensity of light incident from the rear of the vehicle. FIG. 5 is a principal electric wiring diagram of the another embodiment in which the transparency is continuously changed. As shown in FIG. 5, this embodiment is different from the embodiment of FIG. 2 in the structure of the driving circuit 100.

This embodiment shown in FIG. 5 will be described hereinafter.

The oscillation signal from the oscillation circuit 28 is applied to one of the terminals of the exclusive-OR circuit 25 and a gate of an enhansment-type field effect transistor (FET) 40. On the other hand, the output voltage of the NOR circuit 23 is applied to another terminal of the exclusive-OR circuit 25. The output voltage of the exclusive-OR circuit 25 is applied to a gate of FET 39.

Assuming that the output voltage of the NOR circuit 23 is high, the output voltage of the exclusive-OR circuit 25 is in the opposite phase relation with the oscillation signal from the oscillation circuit 28. Therefore, the rectangular voltages from the drain terminals of the FET 39 and 40 are in the opposite phase relation to each other and are applied to the transparent electrode layers 3 and 5, respectively.

The value of the rectangular voltage is controlled by a voltage control circuit 200. In the voltage control circuit 200, a photo conductive element 30 is provided instead of the photo diode 8 shown in FIG. 2. When the photo conductive element 30 does not receive a light, the resistance thereof is set to be higher than the resistance of a resistor 34 so that a voltage of a non-inverting input terminal of an operational amplifier 33 becomes low. A circuit which comprises the operational amplifier 33, resistors 31, 35, 36 and transistor 32 operates to reduce the voltage difference between the voltage of the non-inverting terminal and inverting terminal of the operational amplifier 33. Therefore, when the voltage of the non-inverting terminal of the operational amplifier 33 is low, the output voltage of the voltage control circuit 200 becomes low.

On the other hand, when the photo conductive element 30 receives a light incident from the rear of the vehicle, the resistance thereof reduces, the voltage of the non-inverting terminal of the operational amplifier 33 rises, and the output voltage of the operational amplifier 33 rises. Thereupon, an emitter voltage of the transistor 32 and the voltage of the inverting terminal of the operational amplifier 33 rise till the voltages of the inverting terminal and the non-inverting termianl of the operational amplifier 33 equals to each other. At this time, the output voltage of the voltage control circuit 200 becomes high. That is, the output voltage of the voltage control circuit 200 changes in response to the intensity of light incident from the rear of the vehicle.

Accordingly, at the cases where the vehicle does not change the driving lane, the vehicle does not turn to the left or right, and the vehicle does not move backward, when the photo conductive element 30 receives a light, the voltage which is applied to the liquid crystal panel 50 changes so that the transparency of the reflection mirror is changed.

On the other hand, at the cases where the vehicle changes the driving lane, the vehicle turns to the left or right, or the vehicle moves backward, when the output voltage of the NOR circuit 23 becomes low, the output voltage of the exclusive-OR circuit 25 becomes in the same phase relation with the oscillation signal from the oscillation circuit 28. Thereupon, the rectangular voltages from the drain terminals of the FET 39 and 40 are in the same phase relation to each other, whereby the liquid crystal panel 50 is applied with no voltage. That is, when the vehicle changes the driving lane, the vehicle turns to the left or right, or the vehicle moves backward, the dazzle-free operation of the reflection mirror is disabled compulsorily.

What is claimed is:

1. A control apparatus for a rear view reflection mirror of a vehicle having a manipulation device adapted to be manipulated by a vehicle driver to change a moving direction of said vehicle comprising:
    reflectivity reducing means provided in said reflection mirror for reducing, when electrically driven, reflectivity of light incident thereto;
    darkness detecting means for detecting a dark condition exterior of said vehicle;
    rear light detecting means for detecting an intensity of light incident thereto from the rear of said vehicle and generating a first output signal indicative of the detected rear light intensity;
    manipulation detecting means operatively associated with said manipulation device for detecting a predetermined manipulated condition of said manipulation device and generating a second output signal indicative of a change in the moving direction of said vehicle;
    circuit means, responsive to said darkness detecting means and said rear light detecting means, for generating a third output signal in response to the first output signal of said rear light detecting means when a dark condition is detected by said darkness detecting means; and
    driving means, responsive to said circuit means and said manipulation detecting means, for electrically driving said reflectivity reducing means in response to said third output signal of said circuit means in the absence of said second output signal of said manipulation detecting means so that said reflection mirror is driven into a dazzle-free condition, said driving means preventing said reflection mirror from being electrically driven when said second output signal is generated by said manipulation detecting means.

2. A control apparatus according to claim 1 wherein said manipulation detecting means includes winker manipulation detecting means for detecting the manipulated condition of a winker switch which is manipulated when said vehicle turns to the left or right.

3. A control apparatus according to claim 2, wherein said winker manipulation detecting means comprises a winker manipulation detecting switch which turns on and off in response to turning on and off of said winker switch.

4. A control apparatus according to claim 1 wherein said manipulation detecting means includes reverse position detecting means for detecting that a transmission shift lever is in its "reverse" position.

5. A control apparatus according to claim 4 wherein said reverse position detecting means comprises a back-up light switch for switching the situation thereof when said transmission shift lever is in its "reverse" position.

6. A control apparatus according to claim 1 wherein said manipulation detecting means includes steering wheel rotation detecting means for detecting that a steering wheel is rotated more than a predetermined angle.

7. A control apparatus according to claim 1 wherein said manipulation detecting means comprises winker manipulation detecting means for detecting the manipulation of a winker switch which is manipulated when said vehicle turns to the left or right, reverse position detecting means for detecting that a transmission shift lever is in its "reverse" position, steering wheel rotation detecting means for detecting that a steering wheel is rotated more than a predetermined angle, and logic means for detecting that at least one of said winker manipulation detecting means, reverse position detecting means, and steering wheel detecting means detects the predetermined manipulated condition.

8. A control apparatus according to claim 1 wherein said driving means drives said reflection mirror continuously into a dazzle-free condition in response to an intensity of said rear light.

9. A control apparatus according to claim 1 wherein said reflection mirror includes a liquid crystal panel which reduces transparency thereof for the dazzle-free condition and a reflection layer provided behind said liquid crystal panel.

10. A control apparatus according to claim 1, wherein said reflection mirror comprises a side mirror mounted on a side portion of said vehicle.

11. A control apparatus according to claim 1, wherein said reflection mirror comprises a room mirror mounted in an interior of said vehicle.

12. A control apparatus for a rear view mirror having a reflection panel and a liquid crystal panel therein and mounted on a vehicle equipped with a manipulation device adapted to be manipulated by a vehicle driver to change a moving direction of said vehicle, said apparatus comprising:

a single rear light detecting means mounted on said rear view mirror for detecting an intensity of light incident from the rear of said vehicle;

direction change detecting means operatively connected to said manipulation device for detecting a predetermined manipulated condition of said manipulation device;

signal generating means for generating an electric driving signal; and switching means, responsive to output signals of said rear light detecting means and said direction change detecting means, for switching on and off application of said electric driving signal of said signal generating means to said liquid crystal panel, said switching means switching on the application of said electric driving signal to said liquid crystal panel in response to the output of said rear light detecting means indicative of high intensity of the detected rear light thereby to reduce reflectivity of light of said rear view mirror and switching off the application of said electric driving signal to said liquid crystal panel in response to the output of said direction change detecting means indicative of the change in the moving direction of said vehicle irrespective of the output of said rear light detecting means.

* * * * *